(12) United States Patent
Han et al.

(10) Patent No.: US 7,577,121 B2
(45) Date of Patent: Aug. 18, 2009

(54) METHOD FOR SCHEDULING USERS IN A HIERARCHICAL NETWORK

(75) Inventors: Seung-Jae Han, Basking Ridge, NJ (US); Thierry E. Klein, Fanwood, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 362 days.

(21) Appl. No.: 11/068,002

(22) Filed: Feb. 28, 2005

(65) Prior Publication Data

US 2006/0203778 A1  Sep. 14, 2006

(51) Int. Cl.
*H04Q 7/24* (2006.01)
(52) U.S. Cl. ............... 370/335; 370/338; 370/328; 370/342
(58) Field of Classification Search ................ 370/335, 370/338, 328, 342, 468
See application file for complete search history.

(56) References Cited

U.S. PATENT DOCUMENTS

| | | | |
|---|---|---|---|
| 6,693,915 B1 * | 2/2004 | Lappetelainen et al. ..... | 370/468 |
| 2003/0202497 A1 * | 10/2003 | Csapo ........................ | 370/338 |
| 2004/0185876 A1 * | 9/2004 | Groenendaal et al. .... | 455/456.5 |
| 2005/0007991 A1 * | 1/2005 | Ton et al. ..................... | 370/349 |
| 2006/0050668 A1 * | 3/2006 | Harper et al. ............... | 370/338 |
| 2007/0081498 A1 * | 4/2007 | Niwano ....................... | 370/335 |
| 2007/0173256 A1 * | 7/2007 | Laroia et al. ................ | 455/436 |
| 2007/0230419 A1 * | 10/2007 | Raman et al. ............... | 370/338 |

* cited by examiner

*Primary Examiner*—Alexander Eisen
*Assistant Examiner*—Julio R Perez

(57) ABSTRACT

The present invention provides a method for scheduling mobile units in a wireless telecommunications network including first and second wireless connection points having a wireless communication link therebetween. The method includes determining a first number of mobile units having a wireless communication link with the first wireless connection point, determining a second number of mobile units having a wireless communication link with the second wireless connection point, and scheduling the mobile units based upon the first and second numbers.

28 Claims, 3 Drawing Sheets

METHOD FOR SCHEDULING USERS IN A HIERARCHICAL NETWORK

BACKGROUND OF THE INVENTION

1. Field of the Invention

This invention relates generally to telecommunications systems, and, more particularly, to wireless telecommunications systems.

2. Description of the Related Art

Wireless telecommunications systems may be used to connect mobile units (sometimes also referred to as user equipment or UE) to a network using an air interface. Mobile units may include mobile phones, personal data assistants, smart phones, text messaging devices, laptop computers, desktop computers, and the like. For example, a mobile phone may be used to form a communication link over an air interface that operates according to a Code Division Multiple Access (CDMA2000) Evolution—Data-Optimized (EV-DO) standard or a Universal Mobile Telecommunication Systems (UMTS) standard. For another example, a wireless-enabled laptop computer may connect to the Internet by forming a communication link with an access point over an air interface that operates according to an IEEE 802.11 standard. Many mobile units are capable of communicating with more than one type wireless telecommunications system. For example, a dual-radio smart phone may include network interfaces for an EV-DO network and an IEEE 802.11 network.

Despite the proliferation of wireless technologies, no single technology meets all the potential requirements of applications in the mobile units while also providing sufficient user mobility. Instead, different wireless technologies typically attempt to balance competing demands, e.g. for network capacity and a large coverage area. For example, wireless local area network (LAN) technology provides relatively high capacity over a relatively small range, but the range of access points in the wireless LAN may be too short to cover a large geographical area with reasonable infrastructure cost. In contrast, wide-area wireless technology, such as EV-DO or UMTS networks, may provide coverage to a relatively large area but may limit a per-user bandwidth to values that are typically much smaller than that of wireless LANs.

Overlay networks attempt to combine advantages of different wireless technologies in a single architecture. In the overlay network architecture, multiple layers of cells (each potentially using a different technology) form a hierarchical cell structure. For example, a simple two-layer wireless overlay network may be formed by using the IEEE 802.11 wireless LAN technology for relatively high-bandwidth/small-size cells at the bottom layer and a Third Generation (3G) cellular wireless technology for relatively low-bandwidth/large-size cells at the top layer. Exemplary 3G cellular wireless technologies may include, but are not limited to, EV-DO networks, UMTS networks, and High Speed Downlink Packet Access (HSDPA) networks.

Wireless overlay network architectures are becoming increasingly important and widespread. Hotspot cells, such as IEEE 802.11 cells, are being deployed in places like airports, hotels, shopping malls, coffee shops, and the like. Umbrella coverage may then be provided via one or more 3G wide area cellular base stations, such as for example EV-DO or UMTS base stations. Typically, base stations and IEEE 802.11 hotspot access points use wireline connections such as a T1 or Ethernet for a backhaul link to the wired network. Hotspot services may also be provided in transportation systems such as commuter trains, buses, ferries, airplanes, and the like. Hotspots in transportation systems may be mobile and therefore the access points in the mobile hotspots may require wireless backhaul links. For example, the overlay network may include a wireless backhaul link between access points of the mobile hotspot cells and a base station (or node-B) of a 3G cellular network.

A single radio mobile unit may connect to the access point in the hotspot cell, which may then function as a gateway or relay to a base station in the 3G umbrella network. Thus, the access point may enable wide-area coverage for the single-radio mobile units that only have wireless LAN technology A dual-radio mobile unit may form wireless links with an access point in the hotspot or with a base station in the 3G umbrella network. In some instances, dual-radio users may prefer to connect to the access point in the hotspot cell, which may then function as a gateway or relay to a base station in the 3G umbrella network. Such an indirect transmission path may be advantageous since the connection to the base station may not be as good as the connection to the gateway access point. In addition, the presence of the gateway access point may simplify call management in the 3G network. Indeed, if many mobile units attempt to link directly to the 3G base station, the 3G base station may not be able to efficiently set up and handle the call processing involved for all the mobile units. Deploying a gateway access point may offload some of that processing to the gateway access point, which looks like a single mobile unit to the 3G base station, thereby reducing the processing burden on the 3G base station.

A hotspot cell with a wireless backhaul connection can also serve as an aggregation point for multiple mobile units with dual-radios. Thus, the gateway access point may be able to achieve some statistical multiplexing gains by aggregating the mobile units, which may facilitate buffer management in the network. For example, the variability of the individual traffic streams may be significantly reduced, which facilitates the network management and leads to increased performance. For another example, packing efficiencies may be achieved at the Transmission Control Protocol (TCP) layer, which may allow the gateway access point to maintain a persistent TCP connection to the base station and avoid setting up, tearing down, and re-establishing connections for the different mobile units. The smoother aggregate stream of packets may not be exposed to the variability of the individual packet streams. Therefore some of the adverse effects in TCP, such as TCP slow start and timeouts, can effectively be avoided, leading to a larger aggregate system throughput.

However, as discussed above, the umbrella network typically treats the gateway access point as a single user. For example, a 3G EV-DO base station is generally not aware that one or more of the 3G "users" may not be a physical user but rather an IEEE 802.11 hotspot access point and/or a mobile gateway that serves as a relay to multiple physical users through the IEEE 802.11 air interface. In that case, the 3G EV-DO base station may treat the IEEE 802.11 access point as a single user, even though the IEEE 802.11 access point may be providing wireless connectivity to several physical users. Consequently, the scheduling algorithms employed by the umbrella network may not distribute capacity in the expected and/or desired manner to the "physical" end-users, some of which are one hop away from the EV-DO base station and some of which are more than one hope away from the EV-DO base station.

One goal of conventional scheduling algorithms is to achieve the largest possible utilization of limited air interface resources. Conventional 3G wireless networks employ opportunistic scheduling algorithms, such as the well-known Proportional Fair (PF) scheduling algorithm that is implemented in many EV-DO products. Opportunistic scheduling algorithms take advantage of the time-varying nature of a wireless channel to schedule users when their relative channel conditions are favorable, while at the same time providing a certain degree of fairness to all the competing users. When the "users" include both physical users that are directly connected to a 3G base station and wireless backhaul links from mobile gateways, the scheduling algorithm employed at the EV-DO base station may fairly distribute the network capacity between the users directly connected to the base station and the mobile gateways. However, end-user devices coupled to the mobile gateway are not visible to the scheduling algorithm and consequently may not receive the expected and/or desired quality-of service or fairness.

As an illustrative example, consider an EV-DO scheduler that attempts to give equal throughput to three mobile units directly connected to an EV-DO base station and three other mobile units connected to the EV-DO base station through a single mobile gateway. The EV-DO scheduler attempts to provide equal throughput to all the mobile units, i.e. the EV-DO scheduler attempts to provide each mobile unit with approximately ⅙ of the total throughput available to the EV-DO base station. However, the EV-DO scheduler only sees four EV-DO "users" (three mobile units and the mobile gateway) and therefore attempts to provide each "user" with approximately ¼ of the total throughput of the EV-DO base station. If a scheduler at the mobile gateway is also fair and divides its available throughput equally between users, then the three mobile units connected to the mobile gateway will receive approximately ⅓ of the throughput available to the mobile gateway, or approximately 1/12 of the throughput of the EV-DO base station. In contrast, the three physical users in the wide-area network receive approximately ¼ of the total throughput of the EV-DO base station. Thus, the EV-DO scheduler may not be able to provide equal throughput to all the mobile units.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for scheduling mobile units in a wireless telecommunications network including first and second wireless connection points having a wireless communication link therebetween. The method includes determining a first number of mobile units having a wireless communication link with the first wireless connection point, determining a second number of mobile units having a wireless communication link with the second wireless connection point, and scheduling the mobile units based upon the first and second numbers.

In another embodiment of the present invention, a method is provided for scheduling mobile units in a wireless telecommunications network including first and second wireless connection points having a wireless communication link therebetween. The method includes determining a first number of mobile units having a wireless communication link with the first wireless connection point and providing information indicative of the first number to the second wireless connection point. The method also includes receiving data scheduled for transmission based on the first number and a second number of mobile units having a wireless communication link with the second wireless connection point.

In yet another embodiment of the present invention, a method is provided for scheduling mobile units in a wireless telecommunications network including first and second wireless connection points having a wireless communication link therebetween. The method includes determining a first number of mobile units having a wireless communication link with the first wireless connection point and providing information indicative of the first number to the second wireless connection point. The method also includes transmitting data based on a schedule determined using the first number and a second number of mobile units having a wireless communication link with the second wireless connection point.

BRIEF DESCRIPTION OF THE DRAWINGS

The invention may be understood by reference to the following description taken in conjunction with the accompanying drawings, in which like reference numerals identify like elements, and in which.

Figure 1:
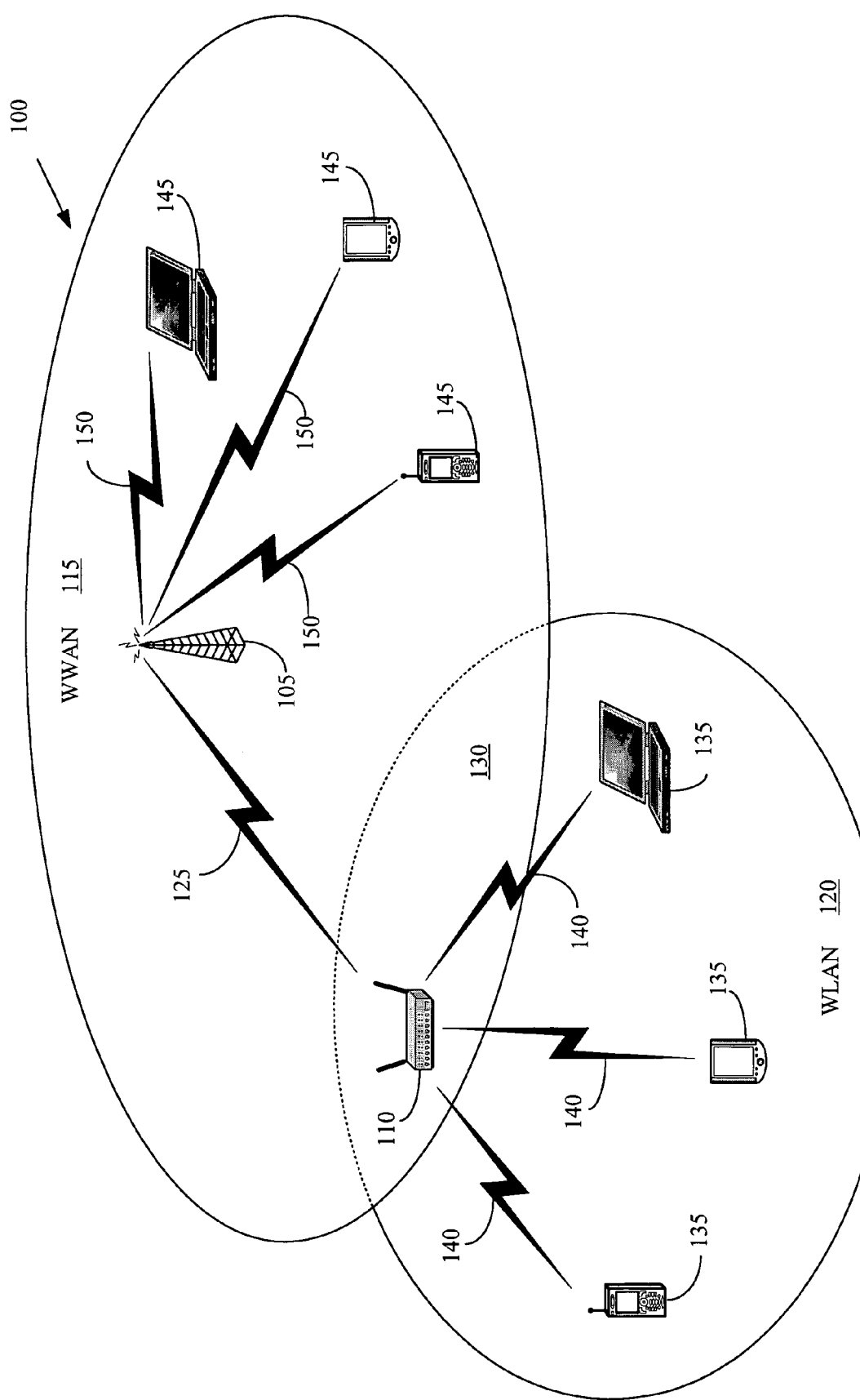
FIG. 1 conceptually illustrates one exemplary embodiment of a wireless telecommunications system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to FIG. 1, one exemplary embodiment of a hierarchical wireless telecommunications system 100 is shown. In the illustrated embodiment, the hierarchical wireless telecommunications system 100 is implemented according to an overlay network architecture in which two wireless connection points 105, 110 provide wireless connectivity to corresponding geographic areas 115, 120. The wireless connection points 105, 110 may form a wireless telecommunications link over an air interface 125. At least a portion of the geographic areas 115, 120 overlap so that devices in an overlapping region 130 may receive wireless connectivity via either of the two wireless connection points 105, 110. However, persons of ordinary skill in the art having benefit of the present disclosure should appreciate that the hierarchical wireless telecommunications system 100 may include any desirable number of wireless connection points that provide wireless connectivity to any desirable number of geographic areas, which may or may not overlap.

In the illustrated embodiment, the wireless connection point 110 is an access point 110 that provides wireless connectivity to mobile units 135 in a Wireless Local Area Network (WLAN) 120. Exemplary mobile units may include mobile phones, personal data assistants, smart phones, text messaging devices, laptops, and the like. The mobile units 135 may form a wireless telecommunications link with the access point 110 over air interfaces 140. The air interfaces 140 may provide wireless connectivity to the wireless LAN 120 using any desirable protocol including, but not limited to, an IEEE 802.11 protocol, an IEEE 802.16 protocol, an IEEE 802.20 protocol, a Bluetooth protocol, and the like. In one embodiment, the access point 110 may be a fixed access point 110 such as may be deployed in an airport, a train station, a coffee shop, or any other desirable location. Alternatively, the access point 110 may be a mobile access point 110 such as may be deployed in an airplane, on a boat, on a train, or any other desirable mobile location.

The wireless connection point 105 shown in FIG. 1 is a CDMA2000 EV-DO (Evolution Data-Optimized) base station 105 that provides wireless connectivity to mobile units 145 in a Wireless Wide Area Network (WWAN) 115. The mobile units 145 may form a wireless telecommunications link with the base station 105 over air interfaces 150. The air interfaces 150 may operate according to any desirable standard, including, but not limited to, a Universal Mobile Telecommunication System (UMTS) standard, a Global System for Mobile telecommunications (GSM) standard, a Code Division Multiple Access (CDMA or CDMA 2000) standard, and the like. Persons of ordinary skill in the art having benefit of the present disclosure should appreciate that the EV-DO base station 105 is merely one example of a base station that may be implemented according to the present invention. In alternative embodiments, any desirable type of wireless connection point may be used and may operate according to any desirable protocol.

The base station 105 may also provide wireless connectivity to the access point 110. In the illustrated embodiment, the air interface 125 provides a wireless backhaul link between the access point 110 and the base station 105. The access point 110 may therefore serve as a gateway and/or aggregation point for the mobile units 135. As will be discussed in detail below, the hierarchical wireless telecommunications system 100 attempts to provide fair access to the mobile units 135, 145 using a scheduling algorithm at the base station 105 that schedules the mobile units 145 and the access point 110 based on the number of mobile units 135 that have communication links with the access point 110 and the number of mobile units 145 that have communication links with the base station 105. In various alternative embodiments, the scheduling algorithm may be implemented in hardware and/or software deployed in the base station 105, the access point 110, any combination thereof, or in any other desirable device.

Figure 2:
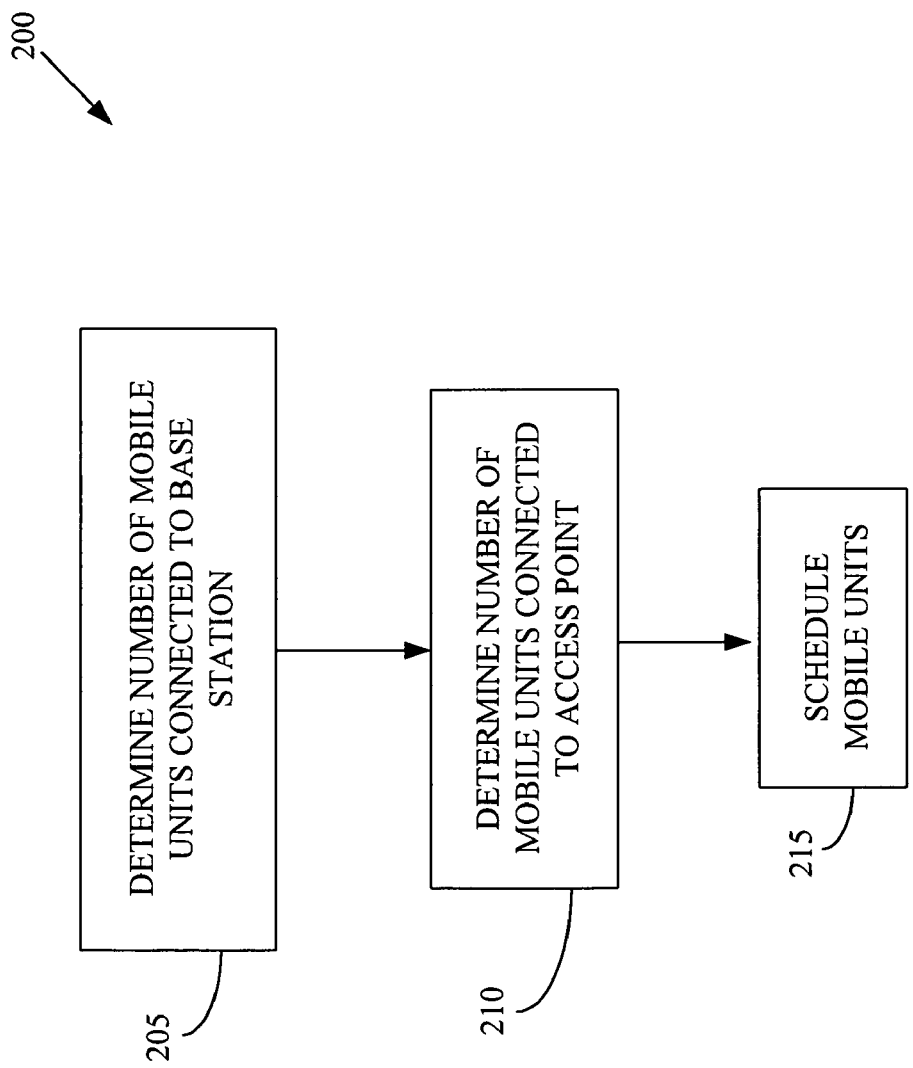
FIG. 2 conceptually illustrates an exemplary embodiment of a method of scheduling that may be used in the wireless telecommunications network, in accordance with the present invention.

FIG. 2 conceptually illustrates an exemplary embodiment of a method 200 of scheduling that may be used in the wireless telecommunications network 100 shown in FIG. 1. In the illustrated embodiment, one or more mobile units may be in communication with a first wireless connection point, such as the base station 105 shown in FIG. 1, and one or more mobile units may be in communication with a second wireless connection point, such as the access point 110 shown in FIG. 1.

The first and second wireless connection points are communicatively coupled over an air interface, such as the wireless backhaul link 125 shown in FIG. 1. The number of mobile units that have a communication link with the first wireless connection point is determined (at 205). For example, the scheduling algorithm at the first wireless connection point may determine (at 205) whether mobile units are active or inactive by monitoring buffer occupancies associated with the mobile units and/or the second wireless connection point(s). If the buffer for a particular mobile unit and/or access point is empty, the corresponding mobile unit may not be active and thus may not be considered in the scheduling decision. Although the first wireless connection point may determine (at 205) that the second wireless connection point is active, it may not be able to determine (at 205) how many mobile units are connected to the second wireless connection point.

The number of mobile units in communication with the second wireless connection point is determined (at 210). In one embodiment, the second wireless connection point may determine (at 210) the number of mobile units by monitoring buffer occupancies associated with the mobile units connected to the second wireless connection point, as discussed above. However, in alternative embodiments, an equivalent number of mobile units in communication with the second wireless connection point may be determined (at 210). Determining (at 210) the equivalent number of mobile units may be desirable when the mobile units are not infinitely backlogged and/or the traffic associated with the mobile unit is bursty, as will be discussed in detail below.

In one embodiment, the equivalent number of mobile units is determined (at 210) as follows. Let $K_{GW}$ be the actual number of mobile units connected to the second wireless connection point and $T_{GW}$ be the throughput achieved on the downlink channel between the first and second wireless connection points. The fair throughput share $T_{mob}$ of each of the connected mobile units may be given by the formula:

$$T_{mob} = \frac{T_{GW}}{K_{GW}}.$$

The second wireless connection point, among others, may be responsible for scheduling and routing traffic received from the first wireless connection point to the different mobile units. If the bandwidth available to the second wireless connection point is fairly shared by the mobile units attached to it, the second wireless connection point can monitor the achieved throughput for each of the mobile units, where the achieved throughput is denoted by $T_j$, where j denotes the mobile index and j=1, . . . , $K_{GW}$.

If the scheduling algorithm is fair, the achieved throughputs should be approximately given by the formula:

$$T_j = T_{mob} = \frac{T_{GW}}{K_{GW}}.$$

The above relation may be used to define the equivalent number of mobile units connected to the second wireless connection point. The mobile unit j may be receiving its fair share or more than its fair share if the throughput $T_j$ of the mobile unit j is equal to or larger than the fair share (i.e., $T_{GW}/K_{GW}$). Such a mobile unit may be counted as one full mobile unit. On the other hand, if the throughput $T_j$ of the mobile unit j is smaller than the fair share, the mobile unit j may then be counted as a fractional mobile unit. The fraction is equal to the ratio of the actual throughput to the fair share for the mobile unit j. The fact that the mobile unit j does not receive a fair share of the throughput may indicate that the corresponding application has bursty traffic and at that time did not provide enough data in the downlink channel to utilize a full fair share of the bandwidth. The equivalent number of mobile units connected to the second wireless connection point may then be calculated according to the following equation:

$$K_{GW}^{(eq)}(n) = \sum_{j=1}^{K_{GW}(n)} \min\left\{\frac{K_{GW}T_j(n)}{T_{GW}(n)}, 1\right\}$$

where n is the index of the time slot. In one embodiment, the first wireless connection point may also determine (at 205) an equivalent number of active mobile units.

One or more mobile units are then scheduled (at 215) based on the numbers of mobile units coupled to the first and second wireless connection points. In one embodiment, the mobile units are scheduled (at 215) using a proportional fairness (PF) scheduling algorithm. However, persons of ordinary skill in the art should appreciate that any desirable scheduling algorithm may be used to schedule (at 215) the mobile units. In the embodiment illustrated in FIG. 1, the wireless telecommunication network 100 is an EV-DO network that implements a time-slotted system in which, in every slot n, each user reports (or advertises) the maximum transmission rate that could be reliably supported in that slot. The advertised transmission rate is commonly referred to as the Data Rate Control (DRC) value of the user.

Mobile units that are connected to the first wireless connection point over an air interface report their DRC value to the first wireless connection point. The PF scheduling algorithm then computes the following scheduling metric for each of the mobile units reporting a DRC value:

$$M_i^{(PF)}(n) = \frac{DRC_i(n)}{R_i(n-1)},$$

where $DRC_i(n)$ is the reported DRC value of user i in time slot n and $R_i(n-1)$ is the smoothed average achieved throughput of user i up to time slot n-1. The value of $R_i(n-1)$ may be calculated according to the following equation:

$$R_i(n) = \left(1 - \frac{1}{T_c}\right) R_i(n-1) + \delta_i(n) \frac{1}{T_c} DRC_i(n),$$

where $T_c$ is a smoothing constant, typically taken to be $T_c$=1000 and $\delta_i(n)$=1 if user i is scheduled in time slot n and $\delta_i(n)$=0 otherwise.

The second wireless connection point may also report a DRC value to the first wireless connection over the wireless backhaul link. However, as discussed above, the second wireless connection point may serve as a relay or a mobile gateway for $K_i(n)$ mobile units in time slot n. Thus, from the perspective of the first wireless connection point, the mobile units that are wirelessly connected to the second wireless connection point are virtually co-located at the location of the second wireless connection point. Thus, the scheduling algorithm may interpret the second wireless connection point as $K_i(n)$ users with the same DRC values in each slot. In one embodiment, the DRC value experienced by the second wireless connection point and the number of users using the second wireless connection point as a relay at that time may be reported. For example, in each time slot, each second wireless connection point (since there may be more than one in the network) may report their corresponding DRC values $DRC_i(n)$, as well as the number of mobile units $K_i(n)$ connected to the second wireless connection point. The number of mobile units $K_i(n)$ may be an integer that counts the actual number of mobile units or a number that represents an equivalent number of mobile units, as discussed above.

The PF scheduling algorithm may then schedule (at 215) the mobile units using a relay scheduling metric calculated with the formula:

$$M_i^{(PF-relay)}(n) = K_i(n) \frac{DRC_i(n)}{R_i(n-1)}.$$

The smoothed average throughput achieved by mobile unit i may be calculated as discussed above. The above equation can be interpreted in two equivalent ways: first of all, the second wireless connection point may report a DRC value that is $K_i(n)$ times higher than its actual value, thereby increasing the likelihood that it is scheduled (at 215) by the scheduling algorithm since its reported channel condition is expected to be very good. Secondly, one can also interpret the equation as the second wireless connection point having an achieved throughput (i.e., $R_i(n-1)$) that is $K_i(n)$ times smaller than it actually is. Therefore the scheduling algorithm attempts to schedule (at 215) this user more often in order to maintain the throughput fairness (in the proportional fair sense) with all other users, e.g. mobile units and/or other mobile gateways connected to the first wireless connection point over an air interface.

For example, the scheduling algorithm may be used to schedule (at 215) a simple network including a base station, a single mobile gateway and three mobile units (M1, M2, M3). Assume that mobile unit M1 is directly connected to the base station and is infinitely backlogged. Mobile units M2 and M3 are connected to the gateway to the base station, with M2 being infinitely backlogged and M3 having e a utilization factor of ½. Assuming that the channel condition of the mobile gateway is the same as that of mobile M1, the scheduling algorithm attempts to schedule (at 215) the mobile units M1, M2, M3 to provide an equal and fair share to all three mobile units M1, M2, M3. In particular, it would be desirable that mobile units M1 and M2 receive the same throughput (or the same share of the resources), while mobile unit M3 should receive a throughput equal to half that of mobiles M1 and M2.

Table 1 shows the respective shares of the three mobiles M1, M2, M3 for different resource allocation algorithms. The resource allocation determined by a conventional PF scheduling scheme, in which the mobile gateway is reported as a single user, is shown in the column "PF". In the second scheme marked "$K_{GW}=2$", the mobile gateway reports the number of users connected to the gateway without regard to their traffic burstiness. In the third scheme, labeled "$K_{GW}=1.5$", the mobile gateway reports the equivalent number of users connected to the gateway, which in this example is equal to $1+½=1.5$.

TABLE 1

|  | M1 | M2 | M3 |
|---|---|---|---|
| PF | 1/2 | 1/3 | 1/6 |
| $K_{GW}=2$ | 1/3 | 4/9 | 2/9 |
| $K_{GW}=1.5$ | 2/5 | 2/5 | 1/5 |

The results in the table demonstrate that the "$K_{GW}=1.5$" scheduling algorithm achieves the objective of providing mobile units M1 and M2 with the same throughput (or the same share of the resources), while providing the mobile unit M3 a throughput equal to half that of mobile units M1 and M2. In the PF algorithm, the number of users connected to the gateway is under-estimated and therefore the throughput of mobile unit M1 is larger than that of mobile unit M2 (and larger than it should be). On the other hand, in the enhanced scheduling algorithm based on the actual number of users connected to the gateway, the reported number over-estimates the fair throughput share of each user and as a consequence, the throughput of mobile unit M1 is lower than that of mobile unit M2 (and therefore lower than it should be).

Figure 3:
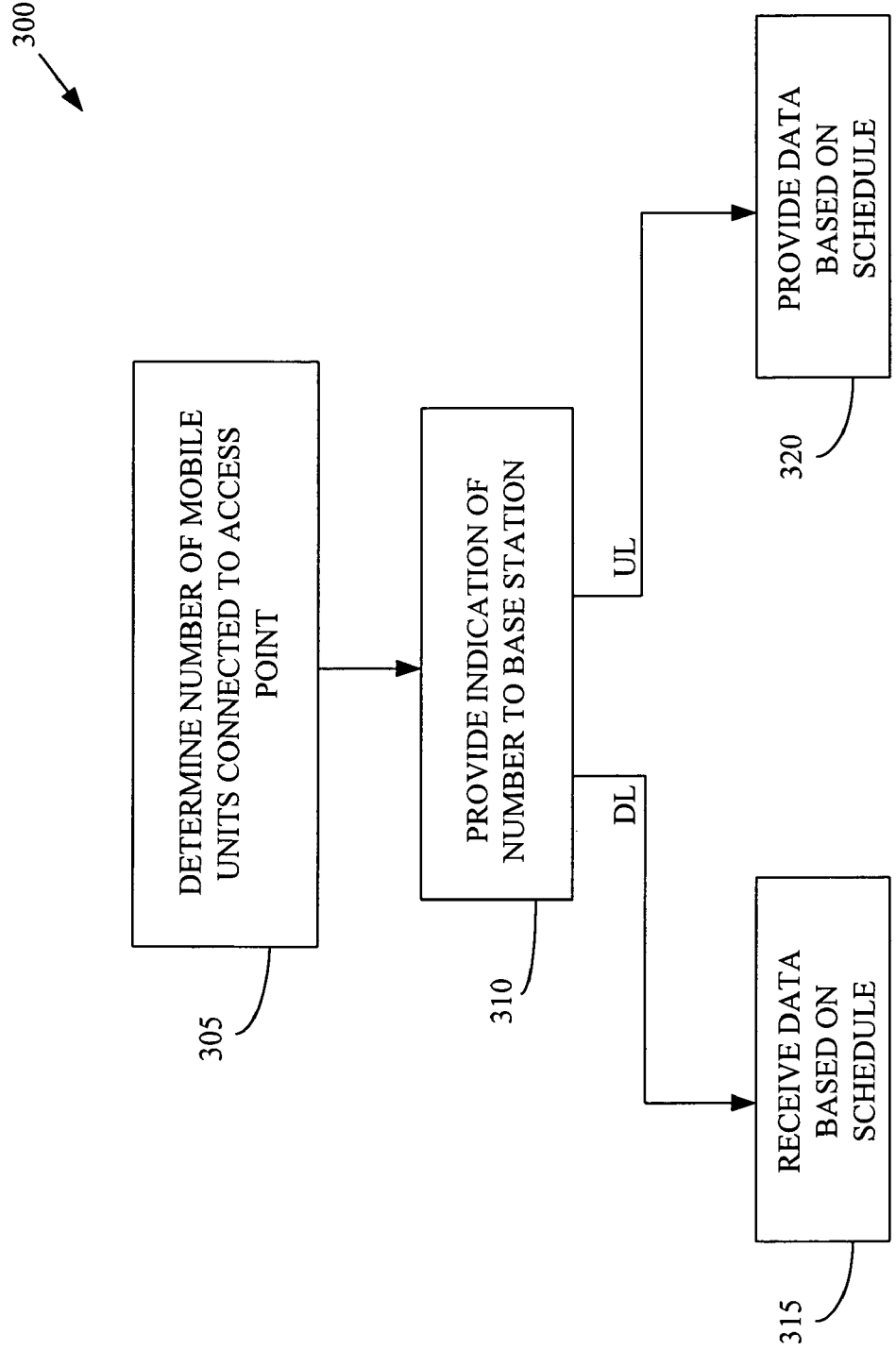
FIG. 3 conceptually illustrates an exemplary embodiment of a method of reporting and scheduling that may be used in the wireless telecommunications network, in accordance with the present invention.

FIG. 3 conceptually illustrates an exemplary embodiment of a method 300 of reporting and scheduling that may be used in the wireless telecommunications network 100 shown in FIG. 1. In one embodiment, the method 300 may be implemented in an access point that is connected to a base station by a wireless backhaul link. As discussed above, the access point may function as a relay and/or a gateway, and it may be mobile or fixed. The number of mobile units connected to the access point or, alternatively, the equivalent number of mobile units, is determined (at 305), as discussed above. The access point then provides (at 310) an indication of the number of mobile units to the base station.

If the mobile units are infinitely backlogged and there is no bursty traffic, the access point provides (at 310) an indication of the actual number of connected mobile units. For example, there are 12 possible values for the advertised transmission rate and transmission format used in EV-DO networks. These values are encoded and transmitted from mobile units to the base station using 4 bits. The remaining four values (denoted herein as v1, v2, v3 and v4) are not used to indicate transmission rates and formats and these values may be available for possible other uses. In one embodiment, these values may be used to provide (at 310) an indication of the number of users attached to the access point. However, the number of mobile units may be limited to four when an indication of the number of users is provided (at 310).

In one alternative embodiment, information indicative of a differential number of users may be provided (at 310). For example, when the access point is initially connected to the base station, the number of mobile units may be set to 0. If a new mobile unit forms a wireless communication link with the base station, the value v1 may be used to report an increase of 1 in the number of attached users. If a mobile unit breaks a wireless communication link with the access point, the value v2 may used to report a decrease in the number of attached users. The values v3 and v4 can either be reserved to other purposes or can be used to indicate the increases and decreases of multiple users by a single report. For example, the value v3 can be used to indicate an increase of two mobile units connected to the access point, and the value v4 can be used to indicate a decrease of two mobile units connected to the access point.

In one embodiment, the four DRC bits are provided (at 310) in every time slot. Normally, the DRC value sent corresponds to one of the 12 transmission rates and formats. However, whenever a new mobile unit is attached to the access point or when a mobile unit leaves the access point, one of the specially encoded values (v1, v2, v3 or v4) may be used and the transmission rate information for the corresponding time slot may be omitted. The slot is essentially stolen for the reporting of the number of mobile units connected to the access point. If the base station receives one of these special values, the corresponding information on the number of mobile units is updated in the scheduling algorithm. The transmission rate and format for the corresponding time slot is assumed to be the same as the last reported value.

The embodiment described above is expected to perform particularly well when the number of mobile units does not change rapidly and mobile units are added to the access point one at a time. The time between arrivals or departures of mobile units at the access point should also be fairly large compared to the slot duration so that stealing a DRC value from time to time does not affect the accuracy of the estimation of the access point's channel condition. This is especially the case if the channel conditions do not change abruptly from slot to slot. Under these conditions, stealing a DRC reporting slot (essentially setting the current DRC value to the last reported value) does not affect the overall performance greatly.

If the mobile units are not infinitely backlogged or their traffic is bursty, the access point provides (at 310) an indication of the equivalent number of connected mobile units. When the access point provides (at 310) the equivalent number of active mobile units connected to it, the reported number is not necessarily integer and can take on any value less than $K_{GW}$. Hence the above-described mechanism for adjusting the number of mobile units may not offer sufficient granularity to accurately report the equivalent number of mobile units connected to the access point. Thus, in one embodiment, the values v3 and v4 may be used to adjust the scale of increments and decrements indicated by the values v1 and v2. Alternatively, the number of bits used to report the DRC values back to the base station may be increased. The latter approach may also be useful in practice for increasing the number of instantaneous transmission rates and the granularity of the DRC reporting.

In alternative embodiments, additional information may also be provided (at 310). For example, scheduling algorithms may explicitly incorporate quality of service requirements, such as a minimum throughput, a maximum latency constraint, a maximum delay jitter constraint, a maximum packet error rate, and the like. Accordingly, the access point may also provide (at 310) minimum throughput requirements and/or maximum latency constraints. In one embodiment, a sum of the minimum throughput requirements for all the mobile units connected to the access point may be provided (at 310). Alternatively, the access point may provide (at 310) an equivalent maximum latency constraint equal to the minimum latency constraint for all the connected mobile units connected to the access point. This equivalent latency constraint may be required since the base station may not be able to distinguish between different flows intended for the different end-users connected to the access point and therefore may not be able to perform intra-flow scheduling for the traffic directed towards the access point.

For traffic on a downlink (DL) between the base station and the access point, the base station schedules downlink data transmissions to the access point based on the information provided (at 310). The data is then provided (at 315) over the downlink in accordance with the schedule. For example, packets intended for one or more mobile units connected to the access point may be provided (at 315) based on the schedule. For traffic on an uplink (UL) between the base station and the access point, the base station may schedule uplink data transmissions from the access point based on the information provided (at 310). The data may then be provided (at 320) to the base station in accordance with the schedule. For example, packets provided to the access point by one or more mobile units connected to the access point may be provided (at 320) to the base station based on the schedule.

One or more embodiments of the present invention may have a number of advantages over conventional practice. For example, the scheduling algorithm described above may be implemented in 3G cellular networks with integrated mobile gateways. The scheduling algorithm may be aware of the presence of mobile gateways and end-users connected to the network using the mobile gateways as relays. The scheduling algorithm may also provide efficient and fair resource allocation and throughputs to the end-user devices connected to the network either directly or through a mobile gateway. An equivalent number of users connected to the base station through the mobile gateway may be determined to capture the burstiness of the users' traffic. Embodiments of the scheduling algorithm may dynamically adjust the throughput provided to each mobile gateway as a function of the equivalent number of users in the network. Various embodiments of the scheduling algorithm may be applicable to many scheduling algorithms, including those that provide minimum throughput and maximum latency guarantees for the end-user devices.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of scheduling mobile units in a wireless telecommunications network including first and second wireless connection points having a wireless communication link therebetween, the first wireless connection point being communicatively connected to a network, comprising:

determining a first number of mobile units having a wireless communication link with the first wireless connection point;

determining a second number of mobile units having a wireless communication link with the second wireless connection point, the second number of mobile units using the wireless communication link between the first and second wireless connection points as a wireless backhaul link for communication with the network, wherein determining the second number of mobile units having the wireless communication link with the second wireless connection point comprises receiving, at the first wireless connection point, information indicative of the second number of mobile units having the wireless telecommunications link with the second wireless connection point; and scheduling the mobile units based upon the first and second numbers of mobile units so that the first and second numbers of mobile units have fair access to wireless communication resources provided by the first wireless connection point.

2. The method of claim 1, wherein determining the first number of mobile units having the wireless communication link with the first wireless connection point comprises determining a first number of mobile units having a wireless communication link with a base station in an umbrella network.

3. The method of claim 2, wherein determining the first number of mobile units having the wireless communication link with the base station in the umbrella network comprises determining a first number of mobile units having a wireless telecommunications link with a CDMA2000 EV-DO (Evolution Data-Optimized) base station.

4. The method of claim 1, wherein determining the second number of mobile units having the wireless communication link with the second wireless connection point comprises determining a second number of mobile units having a wireless communication link with an access point in a wireless local area network.

5. The method of claim 4, wherein determining the second number of mobile units having the wireless communication link with the access point in the wireless local area network comprises determining a second number of mobile units having a wireless telecommunications link with at least one of an IEEE 802.11 access point and a Bluetooth access point.

6. The method of claim 1, wherein receiving the information indicative of the second number of mobile units comprises receiving information indicative of an equivalent number of active mobile units.

7. The method of claim 1, wherein receiving the information indicative of a second number of mobile units comprises receiving information indicative of at least one of a minimum throughput requirement, a maximum latency constraint, a maximum delay jitter constraint, and a maximum packet error rate.

8. The method of claim 1, wherein receiving the information indicative of the second number of mobile units comprises receiving information indicative of at least one of an advertised transmission rate and a transmission format.

9. The method of claim 1, wherein receiving the information indicative of the second number of mobile units comprises receiving information indicative of at least one of an increment scale and a decrement scale for an equivalent number of active users.

10. The method of claim 9, wherein the information indicative of the second number of mobile units comprises information indicative of an increase or decrease in the equivalent number of users.

11. The method of claim 1, wherein scheduling the mobile units comprises forming a scheduling metric based on the second number of mobile units.

12. The method of claim 1, wherein scheduling the mobile units comprises scheduling the wireless telecommunication link between the first and second wireless connection points.

13. The method of claim 12, wherein scheduling the wireless telecommunication link between the first and second wireless connection points comprises scheduling the wireless backhaul link between the first and second wireless connection points.

14. The method of claim 1, wherein scheduling the mobile units comprises scheduling the mobile units using a proportional fairness scheduling algorithm.

15. A method of scheduling mobile units in a wireless telecommunications network including first and second wireless connection points having a wireless communication link therebetween, the first wireless connection point being communicatively connected to a network, comprising:

determining a first number of mobile units having a wireless communication link with the first wireless connection point;

providing information indicative of the first number of mobile units to the second wireless connection point, wherein providing the information indicative of the first number of mobile units comprises providing information indicative of an equivalent number of active mobile units;

receiving data scheduled for transmission based on the first number of mobile units and a second number of mobile units having a wireless communication link with the second wireless connection point, the second number of mobile units using the wireless communication link between the first and second wireless connection points as a wireless backhaul link for communication with the network, and the data being scheduled so that the first and second numbers of mobile units have fair access to wireless communication resources provided by the first wireless connection point.

16. The method of claim 15, wherein determining the first number of mobile units having the wireless communication link with the first wireless connection point comprises determining a first number of mobile units having a wireless communication link with an access point in a wireless local area network.

17. The method of claim 15, wherein providing the information indicative of the first number of mobile units comprises providing information indicative of at least one of a minimum throughput requirement, a maximum latency constraint, a maximum delay jitter constraint and a maximum packet error rate.

18. The method of claim 15, wherein providing the information indicative of the first number of mobile units comprises providing information indicative of at least one of an advertised transmission rate and a transmission format.

19. The method of claim 15, wherein providing the information indicative of the first number of mobile units comprises providing information indicative of at least one of an increment scale and a decrement scale for an equivalent number of active users.

20. The method of claim 15, wherein providing the information indicative of the first number of mobile units comprises providing information indicative of an increase or decrease in an equivalent number of users.

21. The method of clam 15, wherein receiving said data comprises receiving data intended for transmission to at least one of the mobile units having a wireless communication link with the first wireless connection point.

22. A method of scheduling mobile units in a wireless telecommunications network including first and second wireless, connection points having a wireless communication link therebetween, the first wireless connection point being communicatively connected to a network, comprising:

determining a first number of mobile units having a wireless communication link with the first wireless connection point;

providing information indicative of the first number to the second wireless connection point, wherein providing the information indicative of the first number of mobile units comprises providing information indicative of an equivalent number of active mobile units;

providing data based on a schedule determined using the first number and a second number of mobile units having a wireless communication link with the second wireless connection point, the second number of mobile units using the wireless communication link between the first and second wireless connection points as a wireless backhaul link for communication with the network, and the data being scheduled so that the first and second numbers of mobile units have fair access to wireless communication resources provided by the first wireless connection point.

23. The method of claim 22, wherein determining the first number of mobile units having the wireless communication link with the first wireless connection point comprises determining a first number of mobile units having a wireless communication link with an access point in a wireless local area network.

24. The method of claim 22, wherein providing the information indicative of the first number of mobile units comprises providing information indicative of at least one of a minimum throughput requirement, a maximum latency constraint, a maximum delay jitter constraint and a maximum packet error rate.

25. The method of claim 22, wherein providing the information indicative of the first number of mobile units comprises providing information indicative of at least one of an advertised transmission rate and a transmission format.

26. The method of claim 22, wherein providing the information indicative of the first number of mobile units comprises providing information indicative of at least one of an increment scale and a decrement scale for an equivalent number of active users.

27. The method of claim 22, wherein providing the information indicative of the first number of mobile units comprises providing information indicative of information indicative of an increase or decrease in an equivalent number of users.

28. The method of clam 22, wherein providing said data comprises providing data provided by at least one of the mobile units having a wireless communication link with the first wireless connection point.

* * * * *

UNITED STATES PATENT AND TRADEMARK OFFICE
CERTIFICATE OF CORRECTION

| | | |
|---|---|---|
| PATENT NO. | : 7,577,121 B2 | Page 1 of 1 |
| APPLICATION NO. | : 11/068002 | |
| DATED | : August 18, 2009 | |
| INVENTOR(S) | : Han et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 512 days.

Signed and Sealed this

Seventh Day of September, 2010

David J. Kappos
*Director of the United States Patent and Trademark Office*